R. P. HICKS.
TRACTION MACHINE.
APPLICATION FILED JAN. 8, 1915. RENEWED NOV. 30, 1917.
1,288,888.
Patented Dec. 24, 1918.
2 SHEETS—SHEET 1.
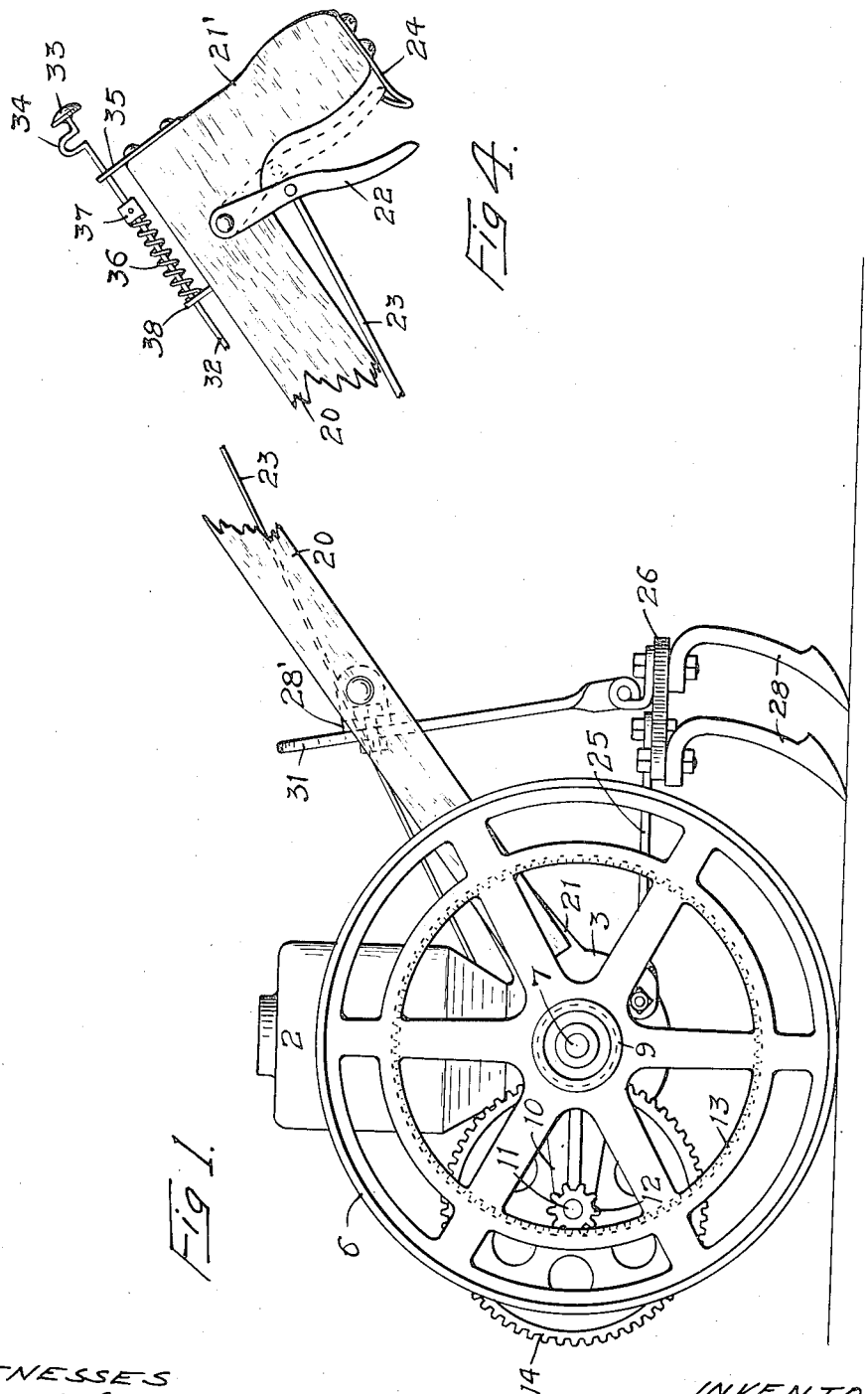
WITNESSES
INVENTOR
REX PARKER HICKS
BY Paul H Paul
ATTORNEYS R. P. HICKS.
TRACTION MACHINE.
APPLICATION FILED JAN. 8, 1915. RENEWED NOV. 30, 1917.
1,288,888.
Patented Dec. 24, 1918.
2 SHEETS—SHEET 2.
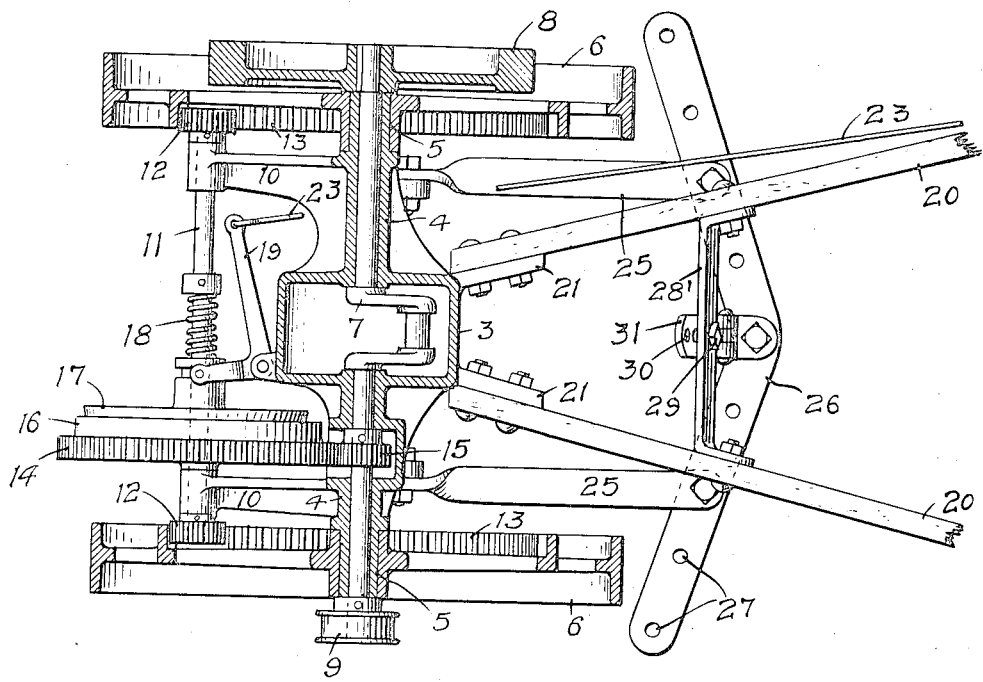
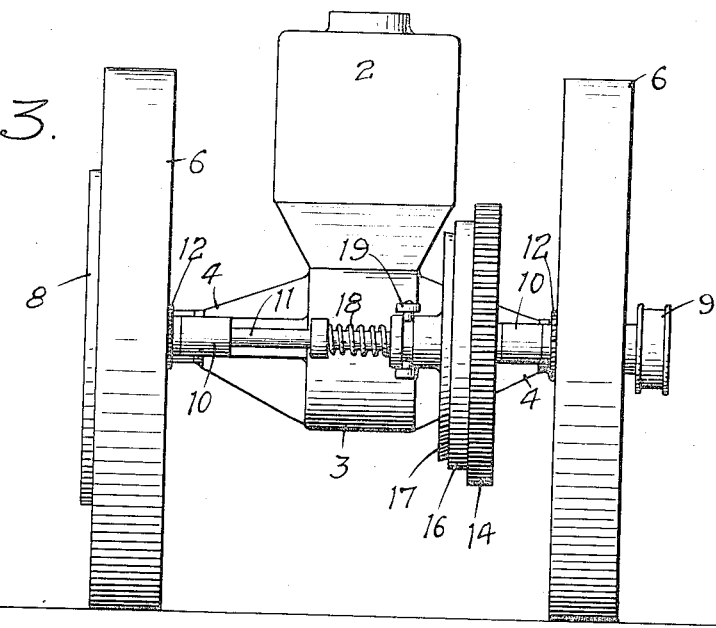
WITNESSES
INVENTOR
REX PARKER HICKS
BY Paul & Paul
ATTORNEYS

UNITED STATES PATENT OFFICE.

REX PARKER HICKS, OF MINNEAPOLIS, MINNESOTA, ASSIGNOR, BY MESNE ASSIGNMENTS, TO BEEMAN GARDEN TRACTOR COMPANY, OF MINNEAPOLIS, MINNESOTA, A CORPORATION OF MINNESOTA.

TRACTION-MACHINE.

1,288,888.

Specification of Letters Patent. Patented Dec. 24, 1918.

Application filed January 8, 1915, Serial No. 1,136. Renewed November 30, 1917. Serial No. 204,781.

*To all whom it may concern:*

Be it known that I, REX PARKER HICKS, citizen of the United States, resident of Minneapolis, in the county of Hennepin and State of Minnesota, have invented certain new and useful Improvements in Traction-Machines, of which the following is a specification.

The object of my invention is to provide a comparatively small, two-wheeled machine, self-propelled, but provided with handle bars for guiding and controlling purposes and adapted particularly for use in gardening, such as operating cultivators or plows between the rows of vegetables or cereals, the person guiding the machine having complete control of its movement at all times.

A further object is to provide a machine of this type of such construction that the carrying wheels can be mounted with a comparatively narrow space between them to allow the machine to travel between rows of plants and provide sufficient room for the fly wheel and for cranking the machine without the necessity of having the crank shaft in the front or the rear of the carrying wheels, or above the axis of the same.

A further object is to provide a light traction machine equipped for use as a stationary engine for furnishing power for light work, such as operating a pump, saw, or the like.

The invention consists generally in various constructions and combinations, all as hereinafter described and particularly pointed out in the claims.

In the accompanying drawings forming part of this specification,

Figure 1 is a side elevation of a traction machine embodying my invention,

Fig. 2 is a plan sectional view, showing the manner of mounting the wheels on extensions of the engine housing, Fig. 3 is a front elevation of the machine, Fig. 4 is a detail view of the hand grips of the handle bars, showing the engine controlling devices.

In the drawing, 2 represents a comparatively small, single cylinder gas engine, of any ordinary or preferred construction, and 3 a crank case having horizontal extensions 4 on each side thereof, provided at their outer ends with bearings 5 for traction wheels 6, loosely mounted thereon. 7 is the crank shaft of the engine, connected with the piston in the usual way, not shown. This crank shaft has bearings in the extensions of the crank case housing and projects outwardly beyond the carrying wheels on each side of the machine.

The traction wheels and the crank shaft are concentric in the foregoing construction and this arrangement I regard as a particularly important feature of my machine, as it permits convenient cranking outside the carrying wheels and the mounting of the wheels concentric with the crank shaft allows me to make the machine much more compact and stable than it would be if the crank shaft and wheels were mounted in any other way. For instance, if the crank shaft was in front or in the rear of the wheels, additional frame work would be necessary and the expense of construction would be increased; and if immediately between the wheels, the crank shaft would have to be raised a sufficient distance to provide room for the fly wheel and this would tend to make the machine top heavy. By making the crank shaft and the carrying wheels concentric, I am able to dispense with a frame. The fly wheel can be mounted on the shaft just outside of the carrying wheels, the engine can be easily cranked, and the carrying wheels can be mounted near together and a comparatively narrow machine provided, suitable for operation between rows of plants, and the center of gravity will be sufficiently low so that the machine will not be top heavy and can be easily steered.

On one end of the crank shaft a fly wheel 8 is mounted adjacent to one of the traction wheels, while the opposite end of the crank shaft is provided with a pulley 9 around which a belt may be passed for transmitting power from the engine when it is stationary and is used for operating some piece of mechanism, such as a pump, saw, or the like. The extensions of the crank case are provided with brackets 10 projecting forwardly therefrom between the carrying wheels, and these brackets have bearings for a counter shaft 11 which extends across the machine, parallel with the crank shaft, and is provided with pinions 12 meshing with gear rings 13 on the carrying wheels 6. A gear wheel 14 is loosely mounted on the counter shaft and meshes with a pinion 15 that is secured on the crank shaft and this gear wheel has one member 16 of a cone clutch thereon, the other member 17 being splined on the counter shaft 11 and normally held in contact with the other member of the clutch by a spring 18. When these clutch members are in operative position, the gear 14 will be locked on the counter shaft and power transmitted from the crank shaft through the counter shaft and pinions 12 to drive the traction wheels. A bell crank 19 is pivoted on said crank case and has its short arm in loose engagement with the hub of the cone member 17, as usual in clutches of this type, so that when the bell crank is rocked, said cone member will be retracted from engagement with the member 16 against the tension of the spring 18. Handle bars 20 are secured at their lower ends to brackets 21 on the crank case and extend upwardly and rearwardly therefrom and have hand grips 21' at their upper ends. A lever 22 is pivoted at one end on one of these hand grips and a rod 23 connects this lever with the long arm of the bell crank 19. A spring 24 is secured to the hand grip adjacent the free end of the lever 22 in position to snap over the end of said lever and lock it in its retracted position or the position where the pull on the rod 23 will be exerted on the bell crank to disengage the clutch and release the gear 14. The crank case is also provided with rearwardly extending bars 25 to the ends of which a transverse drag bar 26 is secured beneath the lower ends of the handle bars. This drag bar is preferably angled in form and has a series of holes 27 therein for securing cultivator teeth 28 thereon, the shape of the cross bar providing for a staggered relation of these teeth with respect to one another and obviously the distance between the cultivator teeth may be varied by changing the position of the holes in the drag bar.

The forward ends of the bars 25 are pivotally supported to allow them and the drag bar to swing vertically for a limited distance beneath the handle bars.

Above the drag bar and secured rigidly to the handle bars is a cross bar 28' having a bolt 29 centrally mounted therein and adapted to enter holes 30 provided in a lifting bar 31 that is pivoted at its lower end on the drag bar and by means of which the drag bar and the cultivator teeth can be raised or lowered to vary the depth of cut of the teeth in the soil. This lifting bar will also allow the cultivator teeth to be raised to an inoperative position in moving the machine from place to place.

I prefer also to mount a rod 32 on one of the handle bars, having a button 33 thereon in position to be pressed by the thumb of the operator, the rod 32 being connected to the throttle of the engine in any suitable manner, which I have not thought necessary to illustrate herein, as it forms no part of my present invention. A loop 34 is preferably formed in the rod to engage the edge of a plate 35 in which the rod is slidable, the downward movement of the rod being against the tension of a spring 36 mounted thereon between a stop 37 and a guide 38 on the handle bar.

In using the machine, the carrying wheels straddle the row of vegetables, corn, or other plant that is to be cultivated, and the cultivator teeth will loosen the soil on each side of the row as the machine moves along, the speed of the engine being timed to drive the machine at a suitable speed, dependent upon the character of the soil in which the machine is working and the comfort of the person guiding it. The fly wheel will, of course, have the usual function of maintaining an even movement of the parts while, whenever desired, power may be transmitted from the pulley, the clutch being disengaged to allow the machine to remain stationary.

I claim as my invention:

1. A traction machine comprising an internal combustion engine, a crank case having lateral extensions on opposite sides of the engine, traction wheels loosely journaled on said extensions, the crank shaft of the engine having bearings in said extensions concentric with said wheels, a driving connecton between said crank shaft and said wheels, handle bars secured to said crank case and projecting rearwardly therefrom, a clutch controlling said driving connection and having an operating means on said handle bars, and a draft connection attached to said crank case and projecting rearwardly beneath said handle bars.

2. A traction machine comprising an internal combustion engine, a crank case therefor provided with lateral extensions, traction wheels loosely journaled on said extensions, a crank shaft journaled in said extensions, a driving connection between said crank shaft and said traction wheels, handle bars secured to said crank case, means operable from said handle bars for rendering said driving connection operative or inoperative, and a draft connection projecting rearwardly from said crank case beneath said handle bars.

3. A traction machine comprising an internal combustion engine having a crank case and lateral extensions formed thereon, traction wheels loosely journaled on said extensions, a crank shaft for said engine, and driving connections between said crank shaft and said wheels, handle bars projecting upwardly and rearwardly from said crank case and having means for controlling said driving connections, and draft connections extending rearwardly from said crank case beneath said handle bars.

4. A traction machine comprising an internal combustion engine having a crank case and lateral extensions formed thereon, traction wheels loosely journaled on said extensions and provided with internal gear rings, said extensions having brackets projecting outwardly therefrom, a counter-shaft journaled on said brackets, a crank shaft having bearings in said extensions and geared to said rings through said counter shaft, handle bars connected to said crank case, and draft connections extending rearwardly from said crank case.

5. A traction machine comprising an internal combustion engine having a crank case and lateral extensions formed thereon, traction wheels loosely mounted on said extensions, a crank shaft having a driving connection with said traction wheels, draft connections pivotally connected at their forward ends to said crank case, a drag bar for said draft connections, and means for guiding said machine and controlling the driving connections between said crank shaft and said wheels.

6. A traction machine comprising an internal combustion engine having a crank case and crank shaft, traction wheels loosely journaled on said crank case concentric with said shaft, a driving connection between said crank shaft and said wheels, and having a controlling means, handle bars connected to said crank case for driving said machine, and a draft connection extending rearwardly from said crank case.

7. An internal combustion engine having a crank shaft and casing, a pair of carrying wheels concentric with said shaft and having a driving connection therewith, handle bars for guiding said wheels, and a draft connection disposed beneath said handle bars.

8. An internal combustion engine having a crank shaft and casing, a pair of carrying wheels concentric with said shaft, a fly wheel mounted on said shaft, a driving connection between said shaft and carrying wheels, guiding handle bars, and a draft connection beneath said handle bars.

9. An internal combustion engine, having a casing and a transversely extending crank shaft, a counter shaft parallel with said crank shaft, a pair of driving wheels concentric with said crank shaft and each having a driving connection with said counter shaft, guiding handle bars and means mounted thereon for controlling said driving connections and said engine, and draft connections for agricultural implements disposed beneath said handle bars.

10. A machine of the class described comprising a frame, an internal combustion engine mounted thereon and having a transversely extending crank shaft, a counter shaft parallel with said crank shaft, a pair of driving wheels concentric with said crank shaft, each wheel having a driving connection with said counter shaft for operating said wheels simultaneously from said engine, a steering device mounted on said frame for oscillating said wheels on a vertical axis to steer the machine and having means mounted thereon for controlling said driving connection and said engine, and draft connections for agricultural implements disposed beneath said steering device.

In witness whereof I have hereunto set my hand this 30th day of December, 1914.

REX PARKER HICKS.

Witnesses:
GENEVIEVE E. SORENSEN,
EDWARD A. PAUL.